United States Patent
Hara et al.

(10) Patent No.: US 6,728,417 B1
(45) Date of Patent: Apr. 27, 2004

(54) MEASUREMENT APPARATUS

(75) Inventors: Ryuichi Hara, Fujiyoshida (JP); Taro Arimatsu, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/471,116

(22) Filed: Dec. 23, 1999

(30) Foreign Application Priority Data

Feb. 23, 1999 (JP) ............................................ 11/044864

(51) Int. Cl.$^7$ .................................................. G06K 9/40
(52) U.S. Cl. ........................ 382/275; 382/145; 382/152; 382/199
(58) Field of Search ................................ 382/275, 145, 382/152, 199; 356/243.1, 121; 414/416.01; 198/396, 401; 600/405, 398; 250/201.09

(56) References Cited

U.S. PATENT DOCUMENTS

| | | | |
|---|---|---|---|
| 5,675,380 A | 10/1997 | Florent et al. | 348/251 |
| 5,825,483 A | 10/1998 | Michael et al. | 356/243 |
| 5,978,081 A | * 11/1999 | Michael et al. | 356/243.1 |
| 6,072,496 A | * 6/2000 | Guenter et al. | 345/419 |
| 6,100,925 A | * 8/2000 | Rosser et al. | 348/169 |

FOREIGN PATENT DOCUMENTS

| | | | | |
|---|---|---|---|---|
| JP | 04-220511 | | 8/1992 | ........... G01B/11/24 |
| JP | 08201021 A | | 8/1996 | ........... G01B/11/00 |
| JP | 409229635 A | * | 9/1997 | ........... G01B/11/02 |
| JP | 41091387 A | * | 7/1998 | ............ H04N/9/79 |
| JP | 410267616 A | * | 10/1998 | ........... G01B/11/00 |

\* cited by examiner

*Primary Examiner*—Anh Hong Do
(74) *Attorney, Agent, or Firm*—Staas & Halsey LLP

(57) ABSTRACT

There is provided a measurement device being capable of obtaining an image being free from a distortion even if the position of a measurement object varies in image pickup and being capable of performing a precise measurement according to the image. Camera calibration is executed by using a dot pattern or the like, and parameters of a camera model are stored (S1). The image of a reference object is fetched (S2), a corrected reference image being free from a lens distortion and a distortion caused by image pickup in a diagonal direction is formed on the basis of the equation of the camera model (S3), and parameters for detecting the measurement object are set in accordance with the image (S4). In a system operation, the image of the measurement object, the position of which varies, is acquired (S5), and the corrected reference image being free from a distortion as in S3 is formed (S6). The measurement object is detected by using the parameters for detecting the measurement object (S7, S8), necessary data for an application is formed and output (S9). In failure to perform detection, an appropriate message is output (S10, S11).

6 Claims, 4 Drawing Sheets

MEASUREMENT APPARATUS

BACKGROUND OF THE INVENTION

1. Field of the Invention

The present invention relates to a measurement apparatus for measuring characteristic elements such as the position, shape, and size of a measurement object and, more particularly, to the apparatus in which an image is corrected so that image distortion may be reduced to make it possible to improve a measurement precision.

2. Description of the Prior Art

In recent years, in a work site in which industrial products, parts thereof, and the like are treated, a system comprising a visual sensor including a camera means for performing a position measurement, shape determination, a size measurement, and the like of the objects is often used. The visual sensor in such a system detects an image region (hereinafter referred to as object image) corresponding to the object from an image acquired by the camera means. A position measurement, shape determination, a size measurement, and the like of the object are performed on the basis of an analysis result of the detected object image.

In order to detect the object image, information related to the object must be given to the visual sensor. And, a method which is conventionally used for this purpose is as follows.

The image (hereinafter referred to as reference image) of an object (for example, a standard part which represents the same kind of parts, hereinafter referred to as reference object) serving as a reference is acquired by using the camera means in advance and taught in the visual sensor.

In a main work, an image acquired by the camera means is analized using the taught reference image so that the object image of the measurement object (hereinafter referred to as image of the measurement object) is detected. The image of the measurement object, if detected, is further analyzed, and a position measurement, shape determination, a size measurement, and the like of the detected measurement object are performed.

As an actual method of detecting the image of the measurement object using a taught reference image, conventionally used are characteristic detection in which geometric characteristics (straight line, circle, and the like) included in the taught reference image are used; template matching in which a part of the taught reference image (or whole thereof) is used as a template to compare the image of the measurement object; and characteristic amount detection in which the amounts of characteristics, such as area, of images extracted by binarizing the taught reference image and the image of the measurement object image are used.

One problem of the prior art is as follows. Since, in most cases, precise positioning of industrial products, parts, and the like serving as measurement objects is rarely performed in actual work, variations in relative positional relationship between the measurement object and the camera occur, and a kind of image distortion due to the variation cannot be avoided. Such an image distortion is a factor that degrades the precision of various measurements based on the relative positional relationship.

As main factors which cause an image distortion due to variations in positions of an object, the two following factors are known.

(1) Distortion caused by image-formation characteristic of lens (hereinafter referred to as lens distortion); although a pin-hole camera is known as a camera having an image-formation characteristic being free from a distortion, as an actually used industrial camera, a lens (in general, lens system, but, hereinafter simply referred to as a lens) is used in place of the pin-hole camera. The image-formation characteristic necessarily has a distortion to some extent. For example, even if image pickup is performed in a manner such that the camera is caused to face the square object, a precise square image thereof cannot be obtained.

(2) Distortion caused by perspectives transformation (that is, distortion caused by image pickup in diagonal direction); when image pickup of an object, the position of which varies on a certain plane (X-Y plane), is performed, and the optical axis of the camera lens is not perpendicular to the X-Y plane, an image distortion depending on the position and direction of the object on the X-Y plane is generated by different perspectives.

For the distortion generated by the above factors, a measurement object cannot be detected although the measurement object exists within the field of view of the camera. As countermeasures against this, a camera having a small distortion (comprising a lens having a long focal length) has been used, the camera has been designed such that the optical axis of the camera is perpendicular to the X-Y plane, or a small template has been employed to eliminate an influence on a distortion. However, these measures cannot solve the above problems essentially.

Even if the measurement object is successfully detected, when pixel positions of a distorted image on a screen are transformed into positions in a space, errors are contained. Therefore, the precision of measurement outputs and determination outputs are degraded. As a countermeasure against to this, camera calibration is executed in advance to reduce errors generated when the pixel positions on the screen are transformed into positions in a space.

OBJECTS AND SUMMARY OF THE INVENTION

The object of the present invention is to solve the above problems of the prior art described above, by providing a measurement device which is capable of obtaining an image being free from a distortion even if the position of a measurement object varies in image pickup and capable of performing a precise measurement according to the image.

The present invention provides the measurement apparatus in which, even if the position of the measurement object varies in the image pickup operation, an image from which a distortion caused by the variations is removed can be obtained, and precise measurement can be performed according to the image. For this reason, the problems of the prior art are solved.

The present invention improves a measurement apparatus having camera means, an image processing device, and calibration means for performing calibration of the camera means, wherein on the basis of a reference image of an object serving as a reference which the camera has obtained by teaching, and an image of a measurement object, which the camera means has obtained by measurement, characteristic elements including the position, shape, or size of the measurement object are measured.

According to the characteristic feature of the present invention, the image processing device arranged in the measurement apparatus includes corrected reference image forming means which forms a corrected reference image in which a lens distortion and a distortion caused by performing image pickup in a diagonal direction are corrected, by correcting the reference image on the basis of a result of the calibration, and corrected measurement object image forming means which forms a corrected image of the measurement object in which a lens distortion and a distortion caused by image pickup performed in a diagonal direction are corrected, by correcting the image of the measurement object on the basis of the result of the calibration.

A measurement is performed on the basis of the corrected reference image and the corrected image of the measurement object. The image processing device may have means for setting a detection parameter for detecting a measurement object in accordance with the corrected reference image, and detect the measurement object by using the set detection parameter.

When the present invention is applied to a system for detecting a measurement object by using camera means, detection which is not adversely affected by variations in position and attitude at which image pickup is performed can be performed. Since a detection precision is not degraded even if a camera lens has a distortion, a camera or the like using a wide angle lens, i.e., a camera which cannot be easily used due to its distortion can be used. In addition, it is also advantageous that a camera attitude can be inclined with respect to a plane on which a measurement object lies without exerting any adverse influence.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
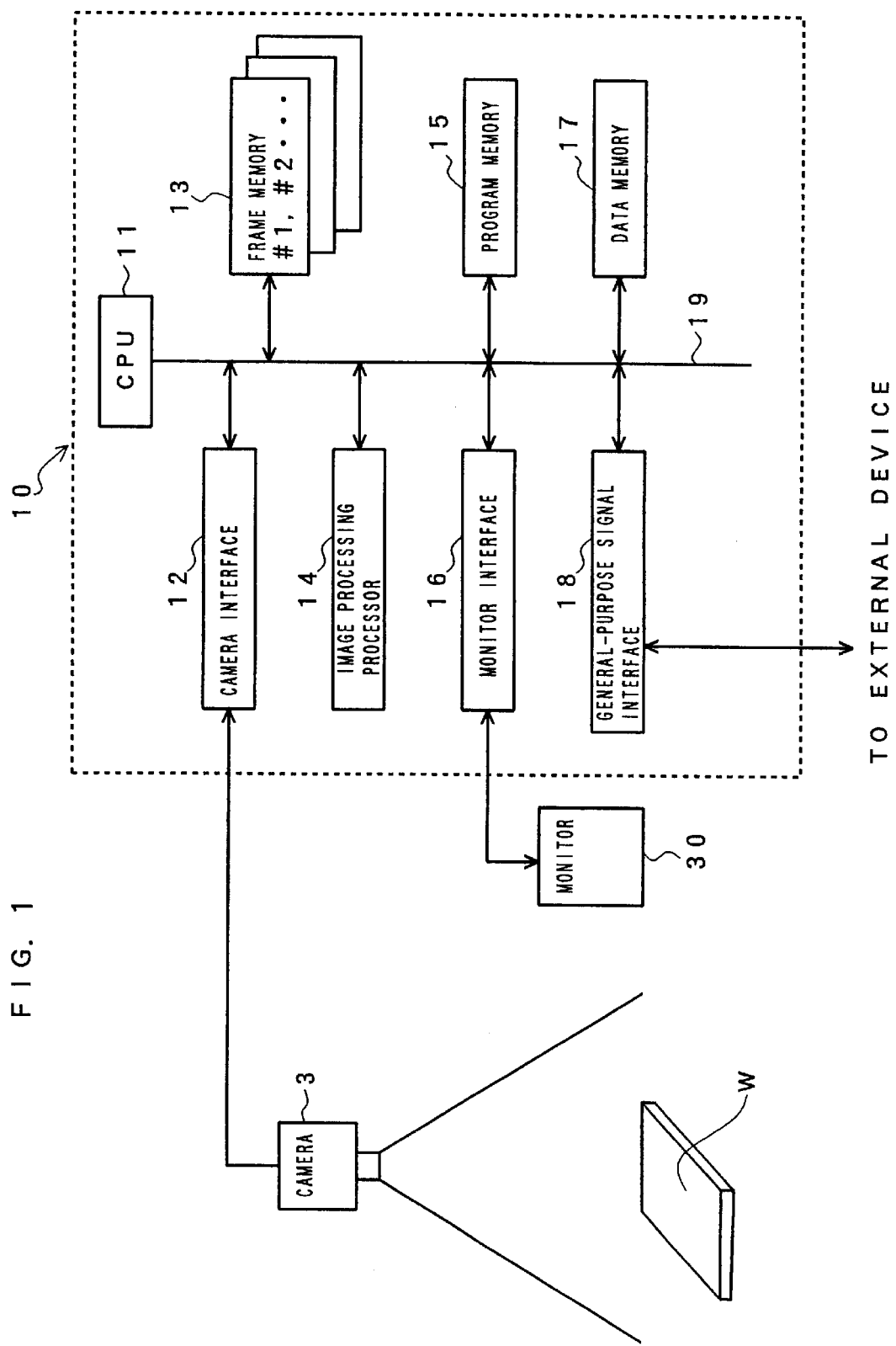
FIG. 1 is a block diagram illustrating the configuration of a main part of a visual sensor including an image correction device, according to an embodiment of a main part of the present invention.

FIG. 1 is a block diagram illustrating the configuration of a main part of a visual sensor including an image correction device according to an embodiment of the present invention.

Referring to FIG. 1, reference numeral 10 denotes an image processing device constituting a main part of the image correction device. The image processing device 10 has a central processing unit (hereinafter referred to as CPU) 11.

To the CPU 11, a camera interface 12, frame memories (#1, #2, #3, . . . ) 13, an image processing processor 14, a program memory 15, a monitor interface 16 connected to a monitor 30 (e.g., a CRT) for displaying an image which is not subjected to image processing yet or which has already been subjected to image processing, a data memory 17 which stores data of various set values, and is used as a temporarily storing means in execution of an arithmetic operation, and a general-purpose signal interface 18 are connected through buses 19.

The camera interface 12 is connected to a CCD camera 3 for photographing an object W (measurement object or reference object). The frame memory 13 stores the gray scale digital image which is transformed from an image signal fetched through the camera interface 12. In the program memory 15, various programs for controlling the operations of the respective parts of the system through the CPU 11 are stored. These programs include a program for performing a process related to removal of an image distortion.

The image processing processor 14 processes image data read from the frame memory 13 according to an instruction of the CPU 11. The data memory 17 is a memory which stores data of the various set values and which is also used as a temporary storage means in execution of various processes. The monitor 30 connected to the monitor interface 16 is, e.g., a CRT, and displays an image obtained before image processing or after image processing according to an instruction of the CPU 11. The general-purpose signal interface 18 is connected to an external device (e.g., robot control device) which uses the output of the visual sensor.

Figure 2:
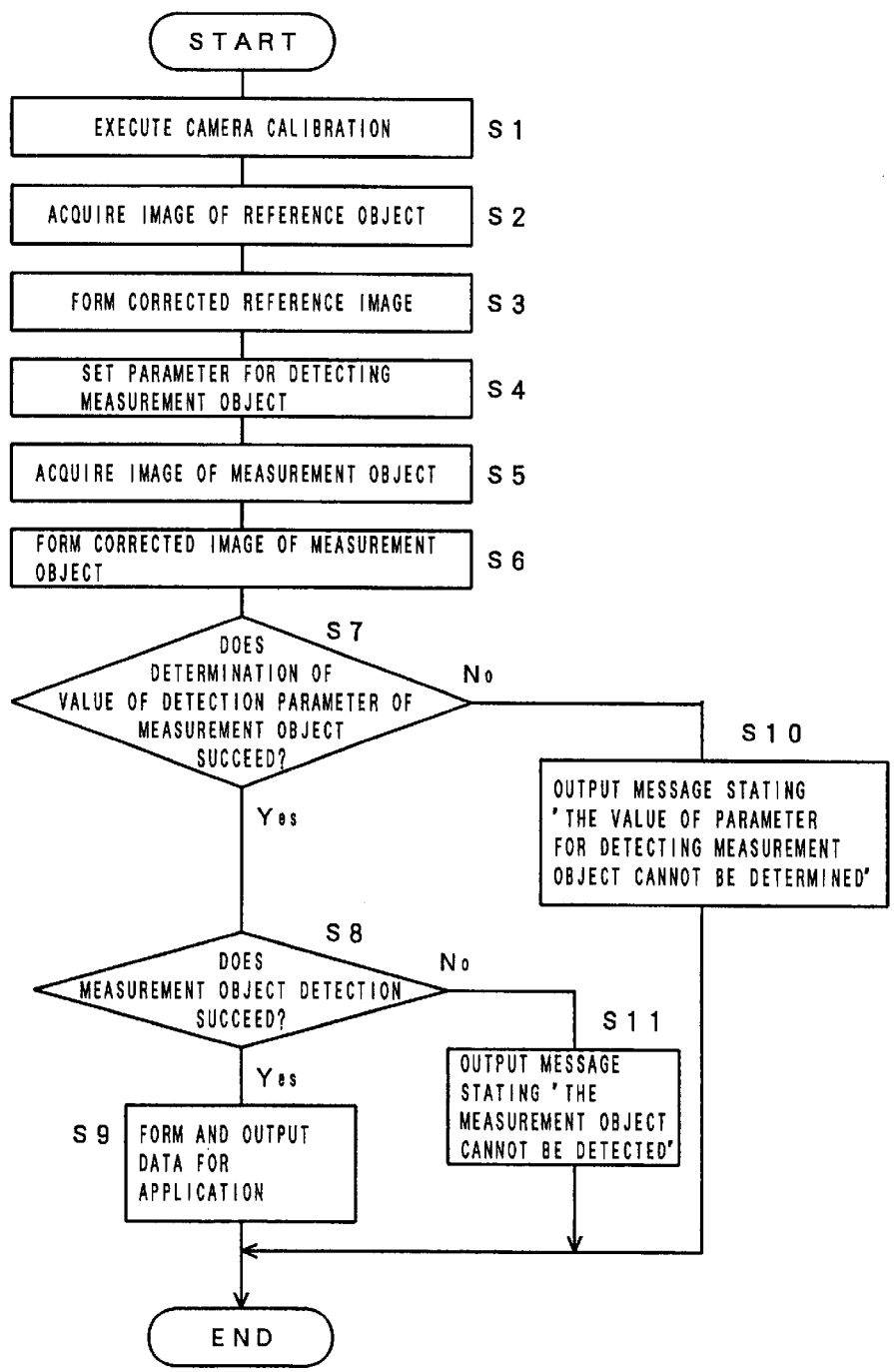
FIG. 2 is a flow chart for explaining an outline of a procedure for performing image correction for the image an object, the position of which varies, by using the visual sensor shown in FIG. 1.

Here, an outline of a procedure for performing image correction for the image of an object, the position of which varies by using the visual sensor shown in FIG. 1, will be described below by using the flow chart in FIG. 2. This procedure is roughly divided into "adjustment" and "main operation" which will be described below in a plurality of steps.

Adjustment

[Step S1]; Camera Calibration

Camera calibration is executed by using a dot pattern. As a camera model, a model of Tsai, which considers, in addition to perspective transformation, a distortion caused by image-formation characteristics of a camera lens with parameters, is applied (see R. Y Tsai, "A Versatile Camera Calibration Technique for High-Accuracy 3D Machine Vision Metrology Using Off-the shelf TV Camera and Lenses", IEEE Journal of Robotics and Automation, vol. RA-3, No. 4 pp. 323–344, 1987).

According to this model, the relationship between points (Xw, Yw, Zw) in a three-dimensional space and points (Xf, Yf) on a pixel coordinate system of the image points is represented by equation (1) and equation (2) described below. In this case, the pixel coordinate system represents a position on a two-dimensional image memory.

$$\frac{dx'}{Sx}X + \frac{dx'}{Sx}XR^2 = f \cdot \frac{r1Xw + r2Yw + r3Zw + Tx}{r7Xw + r8Yw + r9Zw + Tz} \quad (1)$$

$$dy' + dy'YkR^2 = f \cdot \frac{r4Xw + r5Yw + r6Zw + Ty}{r7Xw + r8Yw + r9Zw + Tz} \quad (2)$$

In equation (1) and equation (2) described above, the various symbols have the following meanings.

r1 to r9; Rotational component of homogeneous transformation matrix representing transformation from world coordinate system to camera coordinate system. If there is no distortion by perspective transformation (that is, no distortion caused by image pickup in a diagonal direction), r9=1 is satisfied. If there is a distortion, r9≠1 is satisfied.

TX, Ty, Tz; Translation movement components of homogeneous transformation matrix representing tranformation from world coordinate system to camera coordinate system f; focal length k; Parameter representing distortion of image formation characteristic of lens If there is no distortion, k=0 is satisfied. If there is a distortion, k≠0 is satisfied.

Cx, Cy; Position of the center of an image on pixel coordinate system (corresponding to the position of the optical axis of lens)

X, Y; Position of a pixel on pixel coordinate system. The pixel positions satisfy X=Xf-Cx and Y=Yf-Cy.

dx'; Inter-pixel distance in X direction (pixel pitch)

dy'; Inter-pixel distance in Y direction (pixel pitch)

Sx; Scale factor representing corresponding relationship between distance on pixel coordinate system and distance on world coordinate system R; Distance from image center on pixel coordinate system
The following equation (3) is satisfied.

$$R2=(dx'/Sx*X)^2+(dy'*Y)^2 \qquad (3)$$

where * is a symbol represents multiplication.

Figure 3:
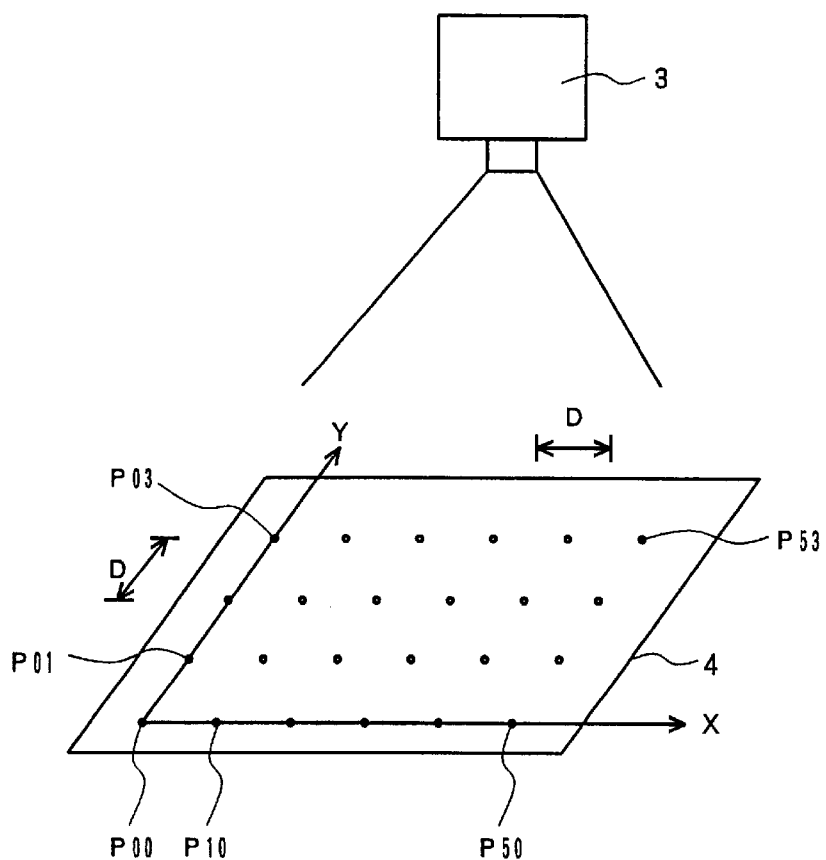
FIG. 3 is a diagram for explaining calibration using a jig.

Calibration is to calculate the parameters r1 to r9 and k by using the camera model described above. More specifically, a jig 4 for the calibration as shown in FIG. 3 is prepared, and the jig 4 is fixed at an almost center of the field of view of the camera 3 (the position need not be exactly set). The attitude of the camera 3 may be set to be appropriate to actual work, and the optical axis of the camera 3 may be inclined with respect to the stationary plane (in this case, an X-Y plane of the world coordinate system).

The jig 4 comprises a group of dots P00 to P53 which are arrayed and plotted so that centers thereof lie exactly at lattice points. The dot P00 is a dot representing an origin. It is assumed that the dot P00 represents the origin of the world coordinate system when the jig is fixed. The group of dots P00 to P53 are on the X-Y plane (Z=0) of the world coordinate system. The array pitches of the group of dots P00 to P53 are common in X and Y directions, and are set to be D (known value). Therefore, the position of Pij on the world coordinate system is generally represented by (iD, jD, 0).

Figure 4:
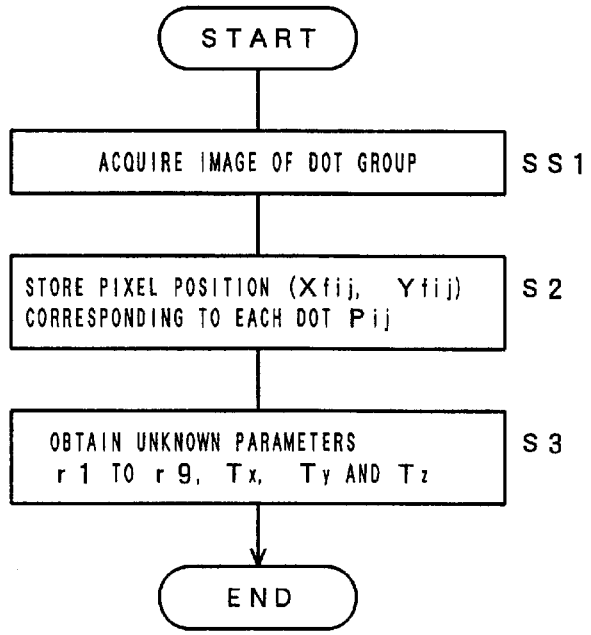
FIG. 4 is a flow chart for explaining an outline of a procedure and processes for calibration.

The outline of the procedure and processes for the calibration is as shown in the flow chart in FIG. 4, and the main points of the respective steps are as follows. The processes are executed such that the CPU 11 starts the program for calibration stored in the program memory 15. The various known parameters (D, Cx, Cy, dx', dy', Sx, and the like) are stored in the data memory 17 in advance.

Step SS1; In a state in which the stationary camera 3 is fixed (it should be noted that the CCD camera 3 is kept fixed hereafter), image pickup of the group of dots P00 to P53 is performed, the image of the group of dots P00 to P53 (dot group image) is fetched into the frame memory 13 of the image processing device 10.

Step SS2; By using the image processing processor 14, the positions (Xfij, Yfij) of the dots Pij of the dot group image on the pixel memory (on the pixel coordinate system) are calculated and stored.

Step SS3; With respect to the dots Pij, simultaneous equations based on the equations (1) and (2) described above are established, and unknown parameters r1 to r9, Tx, Ty, Tz, and k are calculated by an appropriate numerical solution and stored. One set of equations is formed for each set of (i, j) (in this case, 6×4=24 sets).

More specifically, with respect to each set of (i, j), Xw=iD, Yw=jD, and Z=0 are substituted for the equations (1) and (2) described above, and X=Xfij and Y=Yfij are also substituted for the equations. R can be calculated by the equation (3) described above.

[Step S2]; Acquisition of Reference Image

Image pickup of a reference object representing measurement objects is performed by using the camera 3 which has already undergone calibration, and a reference image is taken in the frame memory 13 of the image processing device 10. Reference image data is stored as a gray scale g for every pixel. In this case, a gray scale g stored with respect to a pixel address (m, n) specified by arrayed numbers in X and Y directions on the pixel surface is represented by gmn. The position of the pixel at the pixel address (m, n) on the pixel coordinate system is represented by (Xm, Yn). Note that (Xm, Yn) can be calculated at any time in the image processing device 10 by using the position (Cx, Cy) of the image center on the pixel coordinate system and pixel pitches dx' and dy'.

[Step S3]; Formation of Corrected Reference Image

Since the camera calibration has been completed, r1 to r9, Tx, Ty, Tz, and k are already known parameters. Therefore, the equation (1) and (2) described above can be considered as the relational expressions defining the relation between a point(Xf, Yf) on any pixel coordinate system and a point (Xw, Yw) on a constant plane, by fixing Zw to 0 (Zw=0). Then, using these relational expressions, the pixel position (Xm, Yn) corresponding to the point (Xwm, Ywn) on the constant plane is obtained. The gray scale value gmn of a pixel position (Xm, Yn) is given by interpolating gray scale values at its neighboring discrete pixel addresses.

Each of those discrete points (Xwm, Ywn) is stored in the frame memory 13 in association with gray scale value gmn. In this manner, a reference image from which a lens distortion and a distortion caused by perspective transformation are removed, which is hereinafter referred to as corrected reference image, can be obtained. The constant plane cab be considered to be a virtual camera coordinate system.

Figure 5:
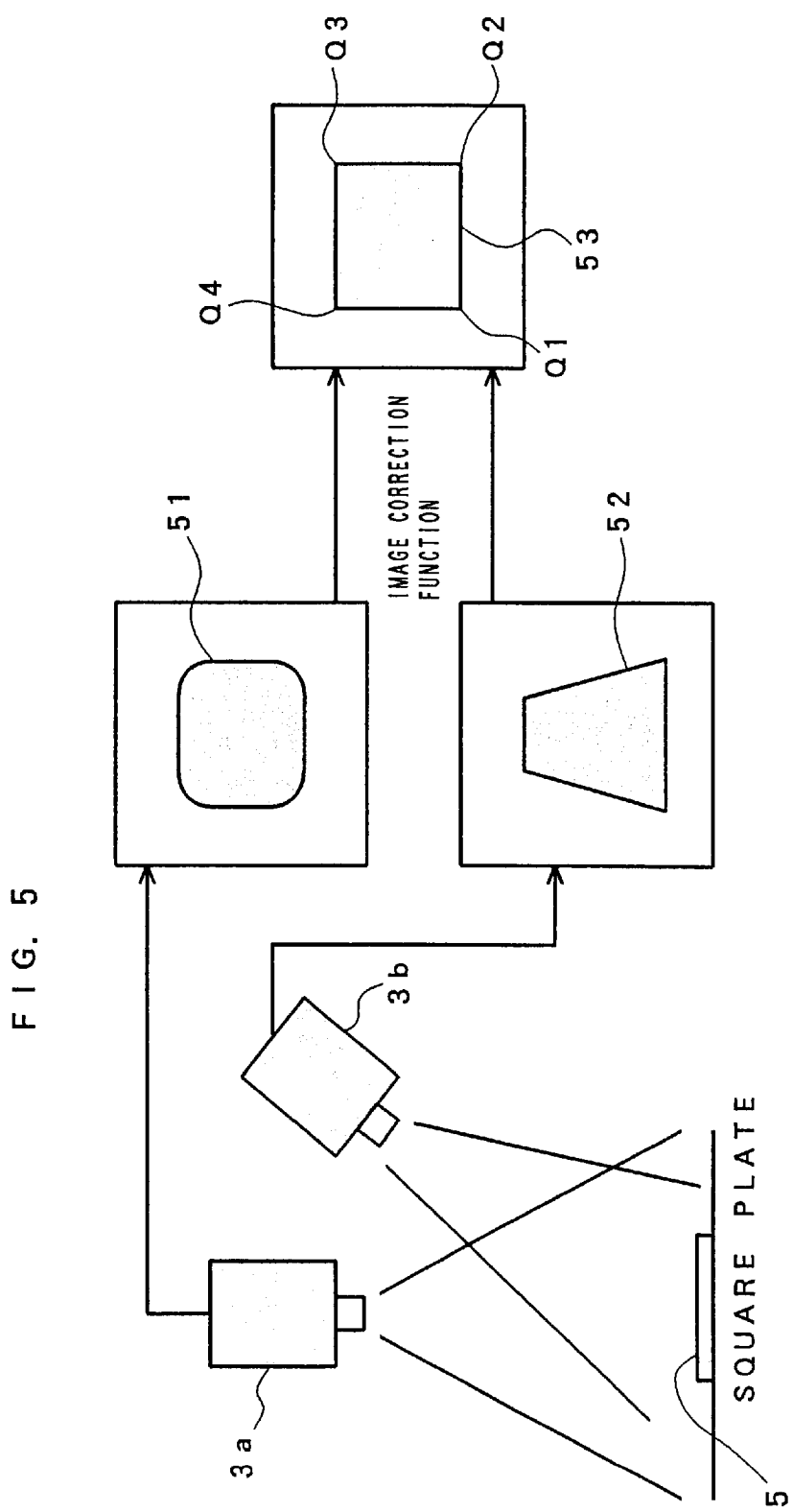
FIG. 5 is a diagram for explaining distortion removal on the assumption that a reference object is a square plate.

FIG. 5 is a diagram for explaining distortion removal on the assumption that a reference object is a square plate 5. Referring to FIG. 5, reference numeral 3a denotes a camera having a lens distortion and an optical axis which is perpendicular to a stationary surface, and reference numeral 3b denotes a camera having no lens distortion and an optical axis which is not perpendicular to a stationary surface.

A reference image 51 picked by the camera 3a has a contour which is curved by a lens distortion. In contrast to this, a reference image 52 picked by the camera 3b has a contour which is not curved, but is distorted into a trapezoid. In the actually used camera 3, both the distortions are complicatedly generated. However, when the correction process is executed, a corrected reference image 53 from which distortions caused by both the factors are removed can be obtained.

[Step S4]; Setting of Parameter for Detecting Measurement Object

Parameters for detecting a measurement object are calculated in accordance with the data of the reference image from which the distortions are removed and which is obtained in step S3, and are stored in the data memory 17. The parameters for detecting the measurement object, as described above, are geometric characteristics (straight line, circle, and the like) included in a taught image (in this case, a corrected reference image), template data formed from a part (whole) of the taught image, binarized image data, and the like. Since the method of forming data (parameters for detecting a measurement object) from the taught image (in this case, a corrected reference image) is known, a detailed description of the method is omitted. As an example in the case of FIG. 5, data (on an imaginary pixel surface) of equations of straight lines Q1-Q2, Q2-Q3, Q3-Q4, and Q4-Q1 constituting a contour Q1Q2Q3Q4 are stored.

Main Operation (in System Operation)

[Step S5]; Acquisition of Measurement Object Image

In an actual operation, image pickup of a measurement object (which need not be accurately positioned) supplied into the field of view of the camera is performed by using the camera 3, and an image of the measurement object is fetched into the frame memory 13 of the image processing device 10. Measurement object image data is stored as a gray scale h for every pixel. With respect to the image of the measurement object, the gray scale h stored with respect to the image address (m, n) described above is represented by hmn. The position of the pixel at the pixel address (m, n) on the pixel coordinate system is (Xm, Yn).

[Step S6]; Formation of Corrected Image of a Measurement Object

In the same manner as in step S3, a corrected image of a measurement object is formed from an image of a measurement object. In this manner, the image of the measurement object from which a lens distortion and a distortion caused by perspective transformation are removed is obtained. An image data of the measurement object is stored in the frame memory 13 so that a position (Xwm, Ywn) on an imaginary pixel surface may correspond to the gray scale value hmn.

[Step S7]; Detection of Parameter for Detecting Measurement Object

Parameters for detecting a measurement object are calculated in accordance with the image data of the measurement object image from which the distortions are removed and which is obtained in step S6, and are stored in the data memory 17. As the parameters for detecting the measurement object, the parameters employed in step S4 described above are detected and stored. According to the example in FIG. 5 described above, reference numeral 5 is considered as a measurement object, and data (on an imaginary pixel surface) of equations of straight lines Q1-Q2, Q2-Q3, Q3-Q4, and Q4-Q1 constituting a contour Q1Q2Q3Q4 are detected. When the data cannot be detected, it is considered that supply of an improper object, failure to supply an object, or the like occurs, and the process proceeds to step S10. When the data can be detected, the process proceeds to step S8.

[Step S8]; Detection of Measurement Object

On the basis of the parameters for detecting a measurement object, set in step S4, and parameter detection values for detecting a measurement object, obtained in step S6, a measurement object is detected. An algorithm for detection is not directly related to the spirit and scope of the present invention, and various algorithms are known (algorithms such as characteristic detection, template matching, and characteristic amount detection, described above, are known). For this reason, a description of the algorithm is omitted. If the detection succeeds, the process proceeds to step S9; if the detection fails, the process proceeds to step S10.

[Step S9]; Formation and Output of Necessary Data for Application

By using the corrected image data of a measurement object, the parameter values for detecting a measurement object calculated in step S6, and the like, necessary data for an application are formed and output. As examples of the necessary data for the application, position data of a typical point of the measurement object, attitude data, size data, (e.g., a diameter, lengths of sides, or an area), shape data (e.g., eccentricity), and the like are known.

[Step S10]; A message of failure to detect parameters for detecting a measurement object is output. In addition, alarm is generated, as occasion demands, to stop the system.

[Step S11]; A message of failure to detect a measurement object is output. In addition, alarm is generated, as occasion demands, to stop the system.

As explained above, Tsai's perspective transformation model considering a lens distortion is employed as a camera model for calibration. However, the present invention is not limited to the model, and any calibration method which can correct at least a lens distortion and a distortion caused by perspective transformation can be employed. For example, calibration may be performed without setting a specific camera model.

In this case, image pickup of the dot pattern described above is performed in a state where a camera is fixedly positioned, and the transformation relationship between a point (Xw, Yw) on a constant surface (X-Y plane of a world coordinate system) and a point (u, v) on a pixel coordinate system in the case where a camera is fixedly positioned is held as table data. Both correction of a reference image and correction of an image of a measurement object are performed by using the table data as transformation data from point (u, v) to point (Xw, Yw).

What is claimed is:

1. A measurement apparatus operating with camera means, an image processing device, and calibration means for performing calibration of the camera means and generating calibration information, in which the presence of a measurement object is detected on the basis of a reference image of a reference object obtained by the camera means taught in advance, and on the basis of an image of a measurement object obtained by the camera means, and based on measurement of one or more geometric characteristic elements of the measurement object, wherein the reference object and the measurement object have substantially the same form, the image processing device comprising:

corrected reference image forming means for forming a corrected reference image by using the calibration information to correct said reference image so that a lens distortion or a distortion caused by performing image pickup in a diagonal direction is reduced; and corrected measurement object image forming means for forming a corrected image of the measurement object by using the calibration information to correct said image of the measurement object so that a lens distortion or a distortion caused by performing image pickup in a diagonal direction is reduced, and where detection of the presence of the measurement object is based on the measurement of the one or more geometric characteristics of the measurement object in the corrected image of the measurement object and on the basis of the corrected reference image.

2. A measurement apparatus according to claim 1, wherein the image processing device further comprises means for setting a detection parameter for detecting a measurement object in accordance with the corrected reference image, and detection of the measurement object is performed by using the set detection parameter.

3. A measurement apparatus operating with an image capture device, and an image processing device, in which the presence of a measurement object is detected on the basis of a reference image of a reference object obtained by the image capture device taught in advance, and on the basis of an image of a measurement object obtained by the image capture device, and based on measurement of one or more geometric characteristic elements of the measurement object, wherein the reference object and the measurement object have substantially the same form, the image processing device comprising:

a reference correction unit to generate a corrected reference image by using pre-determined distortion information to correct said reference image so that a lens distortion or a distortion caused by performing image pickup in a diagonal direction is reduced; and a measurement correction unit to generate a corrected image of the measurement object by using the predetermined distortion information to correct the image of the measurement object so that a lens distortion or a distortion caused by performing image pickup in a diagonal direction is be reduced, and where detection of the presence of the measurement object is based on the measurement of the one or more geometric characteristics of the corrected image of the measurement object and on the basis of the corrected reference image.

4. A method of object detection, where distortion information indicating distortion properties of an image capture system has been prepared in advance, the method comprising:

capturing a reference image of a reference object with the image capture system;

after the capturing of the reference image, capturing a working image of a working object with the image capture system, where the working object has the same form as the reference object;

reducing distortion of the working image using the distortion information; and detecting the presence of the working object based on geometric characteristics of the distortion-reduced working image and based on the reference image.

5. A method according to claim 4, further comprising, before the detecting, reducing distortion in the reference image of the reference object using the distortion information, wherein the detecting is based on the distortion-reduced reference image and geometric characteristics thereof.

6. A method according to claim 5, wherein the distortion information is able to correct distortion caused by variation of a direction of the image capture system toward the objects and/or caused by variation of a position of the objects transverse to the focal axis of the image capture device.

* * * * *

UNITED STATES PATENT AND TRADEMARK OFFICE
CERTIFICATE OF CORRECTION

PATENT NO. : 6,728,417 B1
DATED : April 27, 2004
INVENTOR(S) : Ryuichi Hara et al.

It is certified that error appears in the above-identified patent and that said Letters Patent is hereby corrected as shown below:

Column 4,
Line 66, after "lens", please insert -- . --

Column 9,
Line 6, after "is", please insert -- to --.

Signed and Sealed this

Nineteenth Day of October, 2004

JON W. DUDAS
*Director of the United States Patent and Trademark Office*